US010611595B2

(12) United States Patent
Tiilikka et al.

(10) Patent No.: US 10,611,595 B2
(45) Date of Patent: Apr. 7, 2020

(54) FOIL STAMPING APPARATUS

(71) Applicant: The Procter & Gamble Company, Cincinnati, OH (US)

(72) Inventors: Norm H. Tiilikka, West Chester, OH (US); Susana E. Borrero, Mason, OH (US); Ingo Dieter Erhardt, Steinbach am Wald (DE); Stefan Rudi Wicklein, Steinbach am Wald (DE); Werner Mischer, Kups (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/100,897

(22) Filed: Aug. 10, 2018

(65) Prior Publication Data

US 2018/0346277 A1 Dec. 6, 2018

Related U.S. Application Data

(63) Continuation of application No. 13/331,300, filed on Dec. 20, 2011, now abandoned.
(Continued)

(51) Int. Cl.
*B32B 37/00* (2006.01)
*B65H 37/00* (2006.01)
(Continued)

(52) U.S. Cl.
CPC ......... *B65H 37/002* (2013.01); *B41F 16/006* (2013.01); *B41F 16/008* (2013.01);
(Continued)

(58) Field of Classification Search
CPC .......... Y10T 156/1705; Y10T 156/171; B41F 16/008; B41F 16/002; B41F 16/0026;
(Continued)

(56) References Cited

U.S. PATENT DOCUMENTS

| | | | | |
|---|---|---|---|---|
| 3,139,368 A * | 6/1964 | Flood | ........................ | B65C 3/16 156/458 |
| 3,276,356 A | 10/1966 | Usko et al. | | |

(Continued)

FOREIGN PATENT DOCUMENTS

| | | |
|---|---|---|
| EP | 0738612 | 10/1996 |
| EP | 2098381 | 3/2008 |

(Continued)

OTHER PUBLICATIONS

International Search Report; PCT/US2011/066128; dated Mar. 15, 2012; 13 pages.

(Continued)

*Primary Examiner* — James D Sells
(74) *Attorney, Agent, or Firm* — John G. Powell

(57) ABSTRACT

An apparatus for coating a part that has an asymmetrical edge. The apparatus includes a film dispenser, a film retriever, a mandrel; and a part holder. Preferably one or both of the mandrel and the part holder move in an angular relationship to one another, and the film dispenser and the film retriever move co-operatively in at least two dimensions with respect to the part holder. There is further provided a film having a first edge and a second edge, and the film can be a decorative coating, a protective coating or combinations of these. The film dispenser holds the first edge of the film, the film is positioned between the mandrel and the part holder and the film retriever holds the film second edge.

20 Claims, 6 Drawing Sheets

Related U.S. Application Data

(60) Provisional application No. 61/425,915, filed on Dec. 22, 2010.

(51) Int. Cl.

| | |
|---|---|
| ***B44C 1/17*** | (2006.01) |
| ***B41F 16/00*** | (2006.01) |
| ***B41F 17/18*** | (2006.01) |
| *B41F 17/28* | (2006.01) |

(52) U.S. Cl.
CPC ...... *B41F 16/0026* (2013.01); *B41F 16/0033* (2013.01); *B41F 17/18* (2013.01); *B44C 1/172* (2013.01); *B44C 1/1741* (2013.01); *B41F 17/28* (2013.01); *Y10T 156/1705* (2015.01)

(58) Field of Classification Search
CPC .............. B41F 16/0033; B41F 16/0086; B41F 16/0073; B41F 16/006; B44C 1/17; B44C 1/145; B44C 1/18; B44C 1/1729; B41M 3/12
USPC ................. 156/238; D09/435, 444, 445, 529
See application file for complete search history.

(56) References Cited

U.S. PATENT DOCUMENTS

| | | | | |
|---|---|---|---|---|
| 3,943,023 | A | 3/1976 | Weingrad | |
| 4,081,304 | A | 3/1978 | Bruseschi | |
| 4,084,032 | A | 4/1978 | Pasersky | |
| 4,300,974 | A | 11/1981 | Bauer | |
| 4,373,984 | A | 2/1983 | Hawkins | |
| 4,696,714 | A | 9/1987 | Voorhees | |
| 5,032,206 | A | 7/1991 | Sigerist | |
| 5,139,599 | A * | 8/1992 | Kummerer | B41F 17/28 156/233 |
| 5,198,059 | A | 3/1993 | Curcio et al. | |
| 5,709,770 | A | 1/1998 | Asghar et al. | |
| 6,302,302 | B1 * | 10/2001 | Albisetti | B65D 83/205 222/153.11 |
| 7,410,551 | B1 | 8/2008 | Bethune | |
| 2002/0027137 | A1 * | 3/2002 | Price | A47G 19/2272 220/23.87 |
| 2008/0063863 | A1 | 3/2008 | Colella et al. | |
| 2008/0105144 | A1 | 5/2008 | Tetsuka et al. | |
| 2009/0178581 | A1 * | 7/2009 | Paita | B41F 16/00 101/27 |
| 2009/0178997 | A1 * | 7/2009 | Clark | B65D 1/0223 215/384 |
| 2009/0286054 | A1 | 11/2009 | Meiki et al. | |
| 2010/0064912 | A1 | 3/2010 | Martinez, Jr. | |
| 2010/0242762 | A1 * | 9/2010 | Demange | B41F 15/0872 101/407.1 |

FOREIGN PATENT DOCUMENTS

| | | |
|---|---|---|
| JP | 6023159 | 7/1985 |
| JP | 6124189 | 6/1986 |
| JP | 3051130 | 7/1989 |
| JP | 58122875 | 10/1991 |
| JP | 2014507302 | 12/2011 |
| WO | WO2013085548 | 6/2013 |

OTHER PUBLICATIONS

International Search Report; PCTUS2011/066059; dated Apr. 11, 2012; 12 pages.

* cited by examiner

FOIL STAMPING APPARATUS

FIELD OF THE INVENTION

The present invention is directed to an apparatus for decorative and protective foil stamping on an asymmetrical surface and methods of using the apparatus.

BACKGROUND OF THE INVENTION

Foil stamping on parts for decorative or protective purposes is known. Foil for decorating and protecting parts is also known. The foil is typically a thin, multi-layer sheet or ribbon. The layers typically comprise a thin film carrier, a volatile release substance, a colorant or protective coating, a metal layer, and an adhesive. But prior machines and methods of using these machines are typically used on flat, symmetrical surface. For example, it is known how to cover cylindrical and frusta conical part by simply rolling a mated mandrel over them. The foil is fed between the part and the mandrel and adheres evenly to the part. But these systems do not work parts with asymmetrical geometry as the mandrel cannot maintain constant contact with the asymmetrical part.

Moreover, complex shapes can be foil stamped by creating a stamp that is the negative image of the part to be stamped. While virtually any shape can be stamped in this manner there is one inherent drawback to this process. The foil is flat and when stamped onto a complex shape it necessarily must stretch and fold over onto itself resulting into uneven coverage. Accordingly, there are geometrical limitations to this type of foil stamping.

Soft, deformable stamps are also used to press foil or a label onto an asymmetrical surface. Soda bottles are often labeled in this manner But these soft, deformable stamp pads suffer from the same defects as discussed above. When a flat foil is pressed onto a curved surface it must conform to the surface by folding and stretching. This invariably leads to uneven coverage.

There exists a need for apparatuses and methods that overcome these and other problems associated with prior methods and apparatuses. More specifically there exists a need for an apparatus that can apply a thin decorative or protective film on the surface of a part wherein the part has an asymmetrical portion to it.

SUMMARY OF THE INVENTION

The present invention is directed to an apparatus for coating a part comprising an asymmetrical edge. The apparatus has a film dispenser, a film retriever, a mandrel that rotates, and a part holder. Wherein one or both of the mandrel and the part holder move in an angular relationship to one another. Further the film dispenser and the film retriever move co-operatively in at least two dimensions with respect to the part holder. The apparatus can further comprise a film having a first edge and a second edge, and wherein the film is a decorative coating, a protective coating or combinations of these. The film is preferably a multi-layered film comprising a carrier, a release compound, a metallic foil and an adhesive.

The present invention provides an apparatus that can coat parts with asymmetrical edges with a decorative or protective foil in a fast, economical, method that results in a uniform coating. The present apparatus and methods do not suffer from prior methods and apparatuses that stretched or pulled the foil over irregularly shaped parts causing visible striations in the foil. The ability to coat irregularly shaped parts gives designers substantial new freedom in design. Not only can new part shapes be produced and decorated or protected, but the addition of different surfaces allows for multiple decorations on one part. These and other benefits of the present invention will be apparent to those skilled in the art.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

The present invention may be understood more readily by reference to the following detailed description of illustrative and preferred embodiments. It is to be understood that the scope of the claims is not limited to the specific ingredients, methods, conditions, devices, or parameters described herein, and that the terminology used herein is not intended to be limiting of the claimed invention. Also, as used in the specification, including the appended claims, the singular forms “a,” “an,” and “the” include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent basis “about,” it will be understood that the particular values form another embodiment. All ranges are inclusive and combinable.

As used herein, a “part” can be a container, for example, a bottle, jar, over pack, and the like, a lid, for example, a container cap, an over cap, and the like, a consumer product, for example, a razor, a tooth brush, a powered brush, a skin care device, a pump, an electric razor, an appliance, and the like. Parts can be made from any of the known plastics and other polymeric compositions, naturally occurring compounds like rubber, metals, and other materials of construction know to those skilled in the art. Likewise, parts can be manufactured be methods known to those skilled in the art. Molding and high gloss molding are preferred examples of part manufacture, while stamping, thermo forming and the like are also acceptable methods of forming the parts of the present invention.

Figure 1:
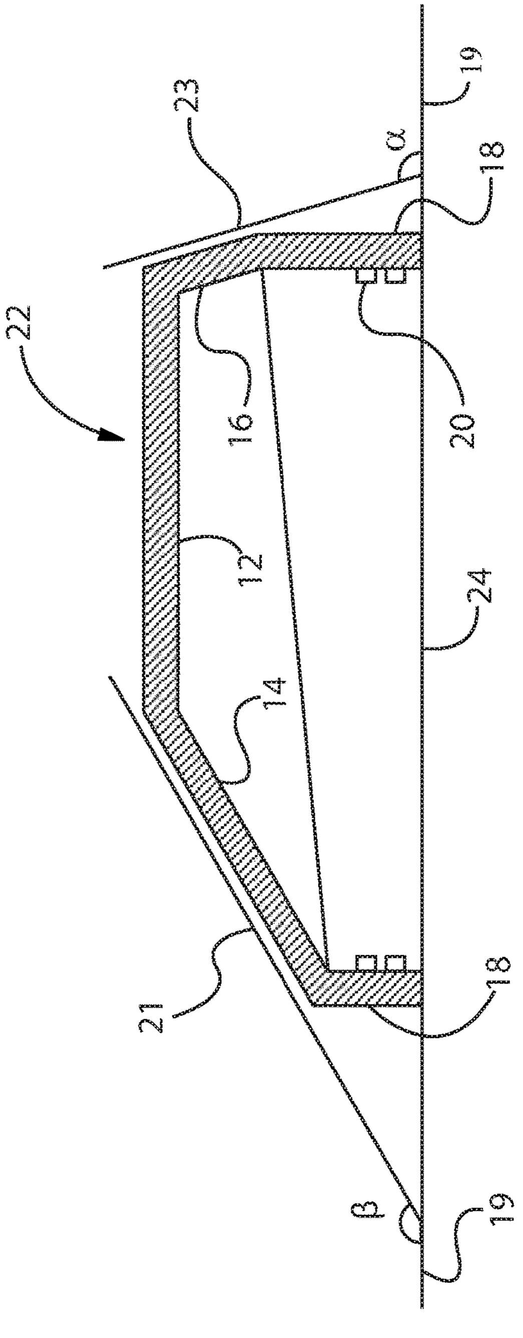
FIG. 1 is a cross sectional view of a part having an asymmetrical edge.
Figure 2:
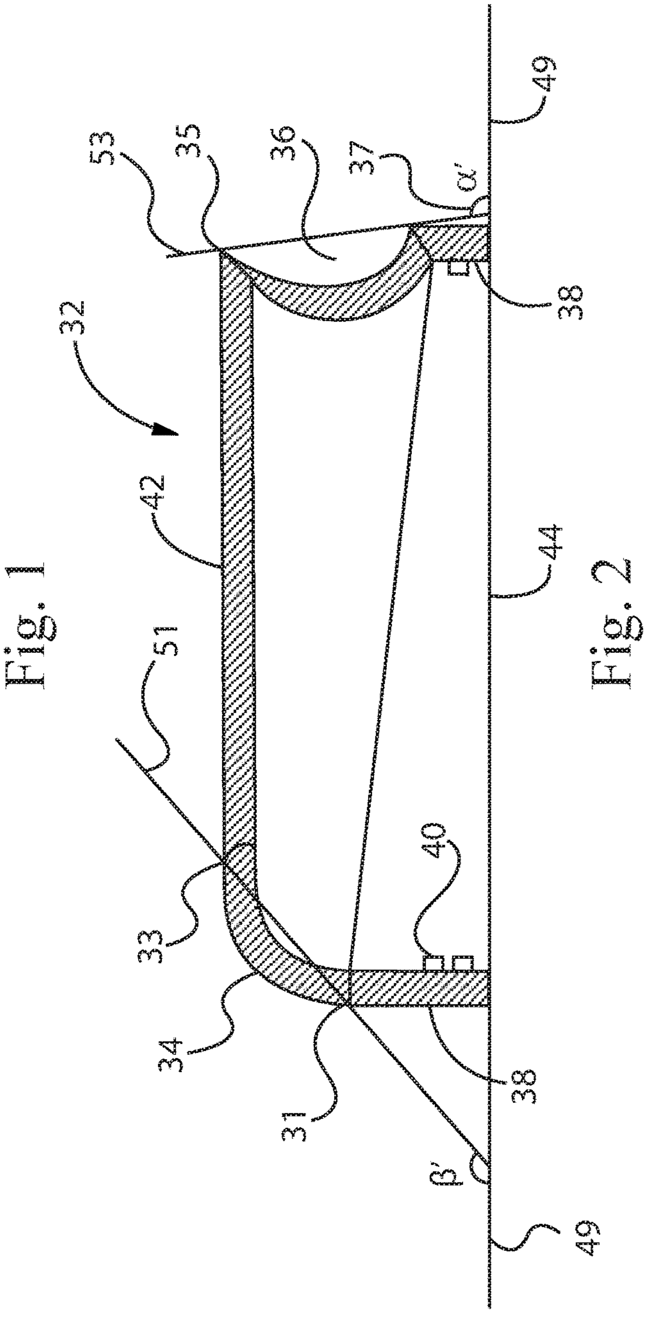
FIG. 2 is a cross sectional view of a part having an asymmetrical edge.

As used herein "a part having an asymmetrical edge" is best defined by reference to FIGS. 1 and 2. FIG. 1 is a cross sectional view of a generally circular lid 22 for a jar, bottle or the like according to the present invention. More specifically, in FIG. 1, lid 22 has a top edge 12 a first angled edge 14 and a second angled edge 16. Lid 22 further comprises side wall 18, threads 20, and bottom 24. A line 19 drawn parallel to bottom 24 is intersected by line 21 drawn parallel to first angled edge 14 to form angle β. Likewise, a line 23 drawn parallel to second angled edge 16 intersects line 19 to form angle α. Therefore, to determine if a part has an asymmetrical edge, vertical cross sections are taken through the center of the part and α and β are calculated. A part has an asymmetrical edge when at least one vertical cross section through the center of the part results in α is not equal to β. Preferably α is not equal to β by at least 3°, more preferably at least about 5°, and even more preferably at least about 10°. It is understood that either α or β can equal 90°. This will occur when there is no angled edge (that is, when top edge 12 meets side wall 18 directly), but if the other angle is greater than or less than 90°, then there is an asymmetrical edge, albeit on only a portion of the part.

Turning now to FIG. 2, which is a cross sectional view of a generally circular lid 32 for a jar, bottle or the like according to the present invention. More specifically, in FIG. 2, lid 32 has a top edge 42 a first angled edge 34 and a second angled edge 36. Lid 32 further comprises side wall 38, threads 40, and bottom 44. First angled edge 34 and second angled edge 36 are concave and convex, respectively. FIG. 2 illustrates that none of the edges of the present invention need be flat. Angles α' and β' can still be calculated as discussed above. Angle β' can be measured by using the exterior intersection point 31 of first angled edge 34 and side wall 38 and exterior intersection point 33 between first angled edge 34 and top edge 42. A line 49 drawn parallel to bottom 44 is intersected by line 51 drawn through exterior intersection point 31 and 33 to form angle β'. Likewise, a line 53 drawn through exterior intersection points 35 and 37 intersects line 49 to form angle α'.

As used herein the term "film" is generically used to describe any thin sheet like material that has multiple layers, at least one of the layers being deposited on the part. The deposited layer can be a protective, decorative coating or the like. Metal, color, labels, decals, prints, plastics and many more materials can be applied to the parts of the present invention by films. Exemplary films that may be suitable for use in the present invention are shown and described in, for example, U.S. Patent Application 2009/0286054, published Nov. 19, 2009 to Meiki, et al., U.S. Patent Application 2008/0063863, published Mar. 13, 2008, to Colella, et al., and U.S. Pat. No. 7,410,551, issued Aug. 12, 2008, to Bethune.

While different films can be used for different end results, a typical film will include a carrier, a release compound, the deposited layer and an adhesive. The carrier holds the layer to be deposited and after deposition the carrier can be retrieved, for example taken up by the film retriever. The carrier is often a thin sheet of plastic or other inexpensive material that can withstand the heat, pressure, or both of the deposition process. The release compound is typically a liquid, gel, or semi-solid material that allows the carrier to pull away easily from the deposited layer without taking any of the deposited layer with it. Preferably the release compound is volatile such that when the carrier is pulled away, the release compound simply evaporates. Alternatively, a non-volatile release compound can be washed or wiped off in a post deposition step.

The deposited layer can be any number of materials and can itself encompass multiple layers. A thin layer of vacuum metalized metal is a popular choice for both decoration and protection. Often a color layer will be added to the metal layer. Metal films can be produced by other methods as well and can be as thick or thin as the desired outcome requires. Obviously, thinner deposited layers will be more economical and have greater flexibility, but thicker layers will be more durable and show less deviation in color when deposited. Finally, the adhesive simply serves to adhere the deposited layer to the part. Adhesives are well known to the art, and they can be activated by temperature, pressure, an activating compound or all of these. In the case of a fast setting epoxy, the part may be coated with one chemical of the epoxy, with the other being on the film. When the film contacts the part, a reaction occurs and the adhesive layer is formed. In most cases the adhesive is simply activated by the pressure and or heat between the mandrel and the part. Necessarily, the carrier side of the film is in contact with the mandrel, while the adhesive and deposited layer side of the film is in contact with the part.

Figure 3:
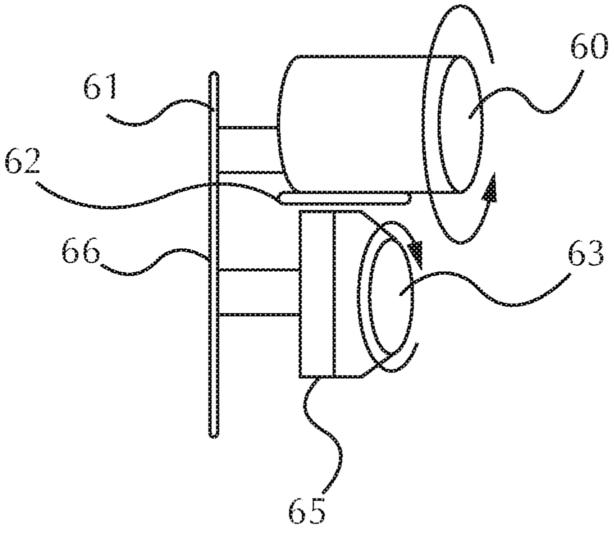
FIG. 3 is a mandrel, part and part holder of the prior art.

Turning now to FIG. 3 which is a prior foil stamping operation shown to highlight the differences and advantages of the present invention. In FIG. 3 there is a rotatable mandrel 60 attached to mandrel holder 61. Part 63 is shown held in place by part holder 66. Part 63 has a flat side wall 65 that rotates in the opposite direction as mandrel 60. Film 62 is fed between mandrel 60 and the flat side wall 65 of part 63 and is in contact with both. As can be seen, the angle between mandrel 60 and part 63 never changes. This allows film 62 to move laterally only without ever being twisted or forced to move outside of one plane of motion. This configuration puts minimal, to no stress on the film and generally results in good coverage. This system is known to work on symmetrical frusta conical parts as well. This simplistic system, however, does not work for parts that have asymmetrical edges.

Figure 4:
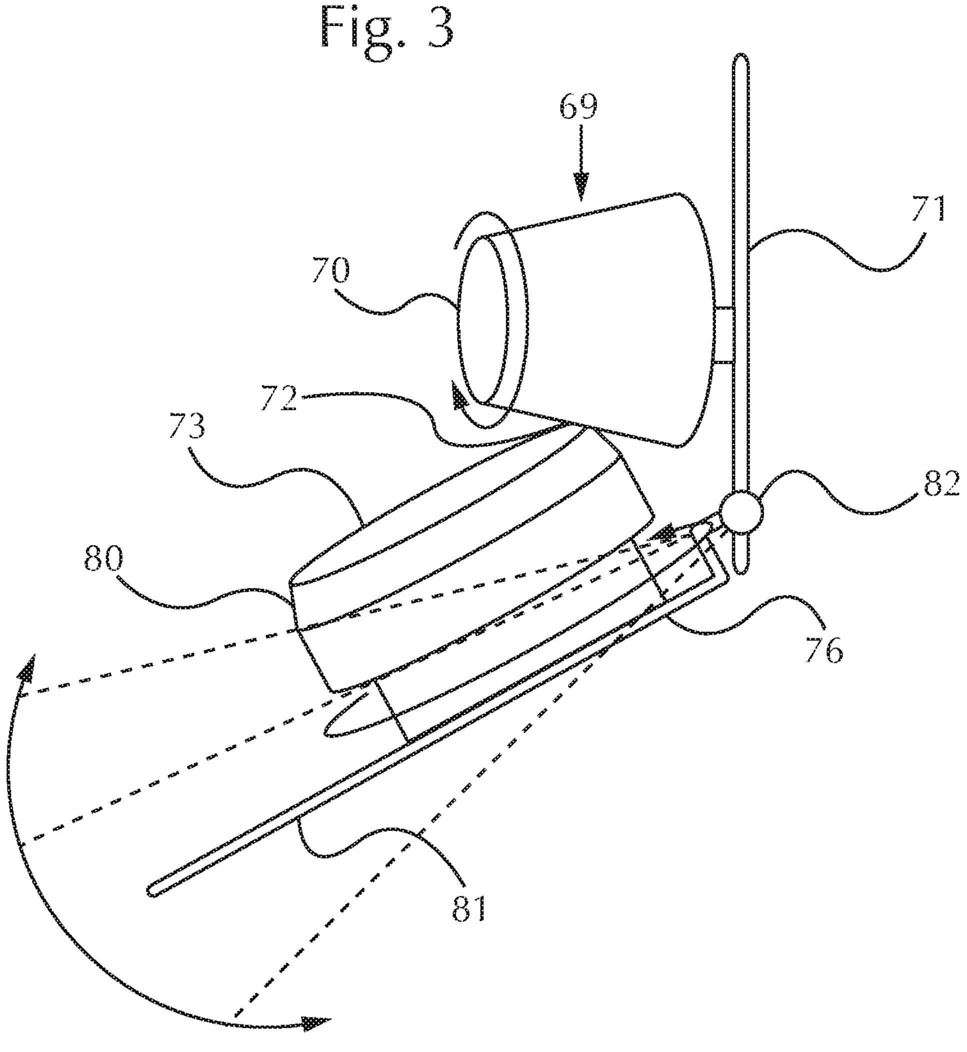
FIG. 4 is a mandrel, part, and part holder according to the present invention.

FIG. 4 illustrates a schematic representation of an apparatus for coating a part comprising an asymmetrical edge according to the present invention. Apparatus 69 has a mandrel 70 that rotates and is attached to a mandrel holder 71. Part holder 76 holds part 73 which has asymmetrical edge 80. Film 72 is disposed between mandrel 70 and part 73. Part 73 rotates in the opposite direction as mandrel 70. As will be explained in further detail, one or both of mandrel 70 and part holder 76 move in an angular relationship to the other. In FIG. 4, part holder 76 rests on plate 81 which is attached to mandrel holder 71 via hinge 82. This is just one way of accomplishing the necessary angular motion of the present invention. The mandrel and part holder need not be connected, as those skilled in the art will appreciate that the angular movement can be controlled remotely by a computer controlling the part holder, the mandrel or both in a preprogrammed manner, for example with servo motors, pneumatic motors and the like.

Mandrels suitable for use in the present invention can be frusta conical in shape (see, for example mandrel 69, FIG. 4), cylindrical (see, for example mandrel 102, FIG. 5), or other generally symmetrical shape. Likewise, the mandrel can be solid or deformable. By deformable it is meant that the mandrel can conform to an irregular shape, for example concave or convex. A deformable mandrel would be used to coat, for example, the first and second angled edges, 34 and 36 respectively, of part 32, FIG. 2. Deformable mandrels are useful when coating part with raised or lowered indicia, for example when a product name, Trade Mark, or logo are molded directly into the part to be decorated.

Figure 5:
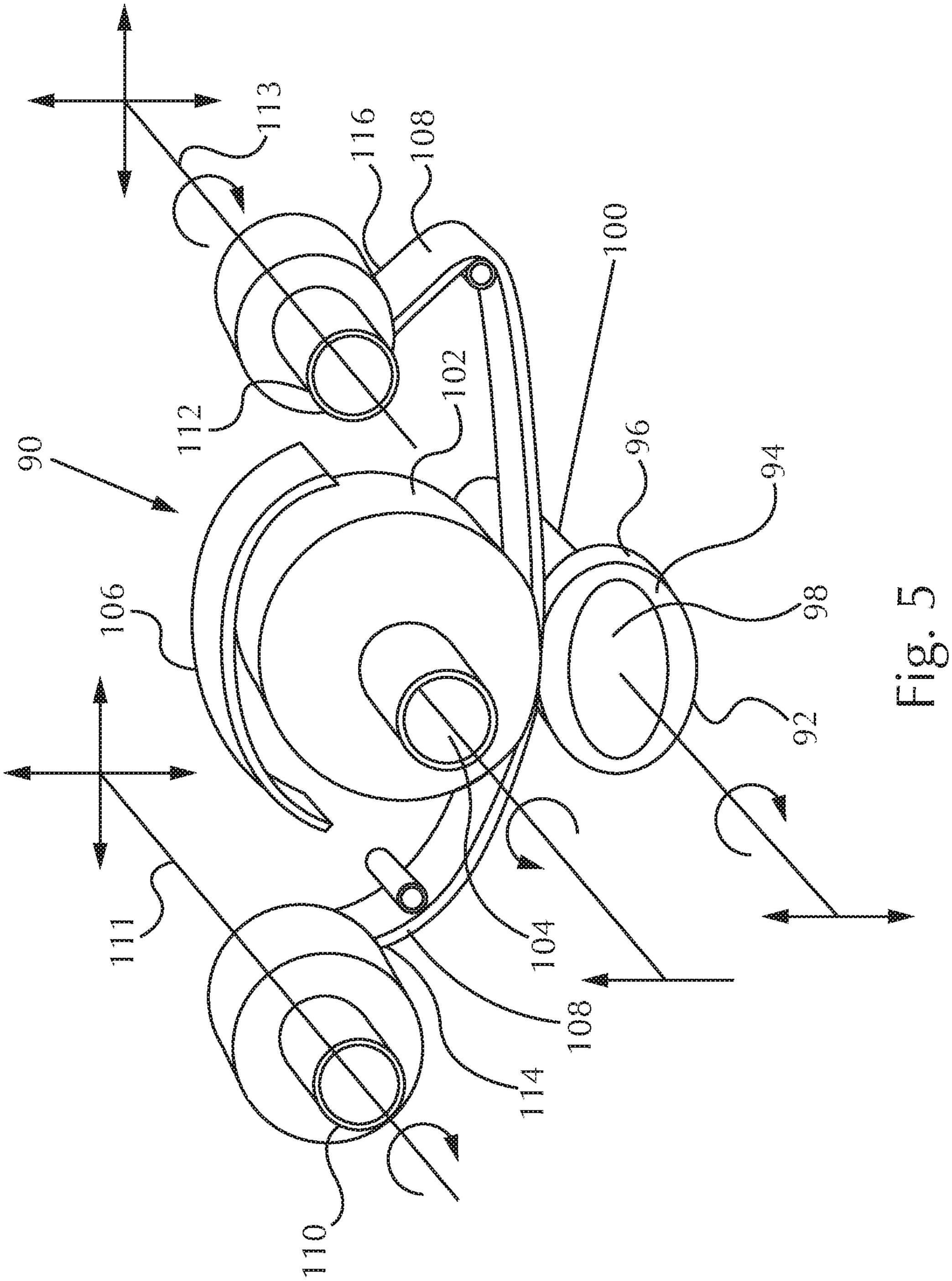
FIG. 5 is an apparatus according to the present invention.

FIG. 5 is a slightly more detailed schematic of an apparatus 90 of the present invention. Part 92 is shown having asymmetrical edge 94, side wall 96 and top edge 98, and is attached to part holder 100. Mandrel 102 is shown attached to mandrel holder 104 and also shown is mandrel heater 106. Mandrel heater 106 is used when the adhesive layer of the film is heat activated, it is not required for pressure sensitive adhesive, epoxies and the like. Film 108 is shown attached to film dispenser 110 and film retriever 112. Film 108 is shown a roll, but in its simplest form film 108 has a first edge 114 attached to film dispenser 110 and a second edge 116 attached to film retriever 112. As shown, mandrel 102 and mandrel holder 104 rotate, while part 92 and part holder 100 rotate in the opposite direction. Film dispenser 110 and film retriever 112 can also rotate to feed film 108 between mandrel 102 and part 92. Film dispenser 110 and film retriever 112 can rotate continuously or they can rotate only between the processing of each part, i.e. indexing. Moreover, a new sheet of film can be loaded between film dispenser 110 and film retriever 112 for each part processed, in this case film dispenser 110 and film retriever 112 need not rotate.

As shown in FIG. 5, film dispenser 110 and film retriever 112 should have the freedom to move about axes 111 and 113. If they move only side to side or only up and down about axes 111 and 113 this would be considered two-dimensional movement. If they can move both up and down and sided to side about axes 111 and 113 this is movement in three dimensions. While not wanting to be bound by any one theory, it is known that as the angle of the asymmetrical edge changes around the circumference of the part, and the part holder (or mandrel, or both) are moved to correct for this change of angle, stress is placed on the film. This stress is not experienced when coating a flat part or even a frusta conical part because the angle between the film, the mandrel and the part never changes.

As used herein "move cooperatively" is intended to mean that at least one of the film dispenser or film retriever moves in two dimensions to account for the changing angle of the mandrel and part having an asymmetrical edge. Preferably both the film dispenser and the film retriever move in two dimensions, more preferably at least one of the film dispenser or film retriever moves in three dimensions and even more preferably both of the film dispenser and film retriever move in three dimensions. How the film dispenser and film retriever move to relieve stress on the film during the film application process depends on the geometry of each individual part. It is understood that the intent and purpose of the present invention is to deal with parts having edges that change in angle at least once during the film application process, but the degree of change, and number of changes will vary by part. As a general principle, however, the present apparatuses keep the surface area of the mandrel generally parallel to the edge of the part being coated, and it is best to feed the film such that it enters the space between the mandrel and the part reasonably flat, that is, without twisting. Likewise, if the film is indexed (not being fed continuously) it can still be manipulated to keep it in a generally flat and parallel relationship to the mandrel and part edge interface. Using this general precept, those skilled in the art will be able to program the movements of the film dispenser, film retriever, or both to each individual asymmetrical part configuration. Methods of movement of a mechanical device such as the film dispenser and film retriever of the present invention will be known to those skilled in the art. Pneumatic motors, servo motors and like can be used to move the film dispenser and film retriever while computer assisted controllers can coordinate the movement with the changing angles of the mandrel and part holder.

Systems

The apparatus of the present invention can be a standalone operation or it can be used in a system with known components, that is, as one module in a system comprising at least two modules. Other modules for use with the modular apparatus of the present invention include, but are not limited to, an apparatus for coating a part that has symmetrical edges, an apparatus for applying labels or decals, an apparatus with a deformable mandrel for coating non-planar surfaces, and the like. In a system of the present invention the part is moved from one module to the next in a predetermined sequence until the desired level of decoration or protection for the part is achieved.

Figure 6:
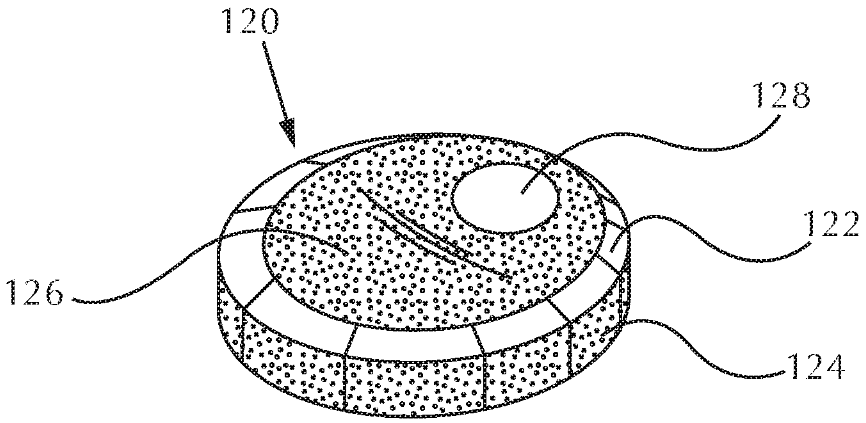
FIG. 6 is a jar having a lid with an asymmetrical edge according to the present invention.

Benefits of a modular system include, but are not limited to: many different decorative or protective coating can be applied to a single part without changing the film between each step; the individual coating steps can be staged to provide the best looking and most efficient overlap between coating of each step; and, it allows layering of films, decal, labels and the like in a flow through operation. By way of exemplifying the benefits of the systems claimed herein, FIG. 6 shows part 120 which is a lid for ajar or bottle. Part 120 has an angled edge 122, flat side wall 124, and top edge 126 which is a concave surface. As shown all three edges have a different decorative coating and there is label, 128 placed over the decorative surface on concave top edge 126. Part 120 can be decorated and labeled in four steps at one station comprising one apparatus by changing the decorative material four times. This inefficient process can be eliminated by using a four-module system according to the present invention.

Methods of Use

A method for coating a part that comprises an asymmetrical edge comprising the steps of, placing a film over the asymmetrical edge of the part and then rolling the part over a mandrel with the film sandwiched there between. In this method, one or both of the mandrel and the part holder move in an angular relationship to one another. While the asymmetrical edge changes angle it is preferred that the film change orientation as well. To accomplish this it is preferred that the edges of the film be held by a film dispenser and a film retriever which move cooperatively to align the film with the changing angle of the asymmetrical edge of the part being coated. The manner of movement to achieve proper film alignment is discussed above.

Parts

The parts of the present invention can be, for example, selected from the group consisting of, a bottle, a jar, an over cap, a pump, a lid, a consumer product and mixtures thereof. Examples of consumer products include, but are not limited to, a razor, a tooth brush, a powered brush, a skin care device, an electric razor, an appliance, and the like. Parts can be made from any of the known plastics and other polymeric compositions, naturally occurring compounds like rubber, metals, and other materials of construction know to those skilled in the art. Likewise, parts can be manufactured be methods known to those skilled in the art. Molding and high gloss molding are preferred examples of part manufacture, while stamping, thermo forming and the like are also acceptable methods of forming the parts of the present invention. The asymmetrical edge can be molded into the part, it can be physically stamped, chemically etched, cut, or ground onto the part, or made in any other manner known to the art.

Figure 7:
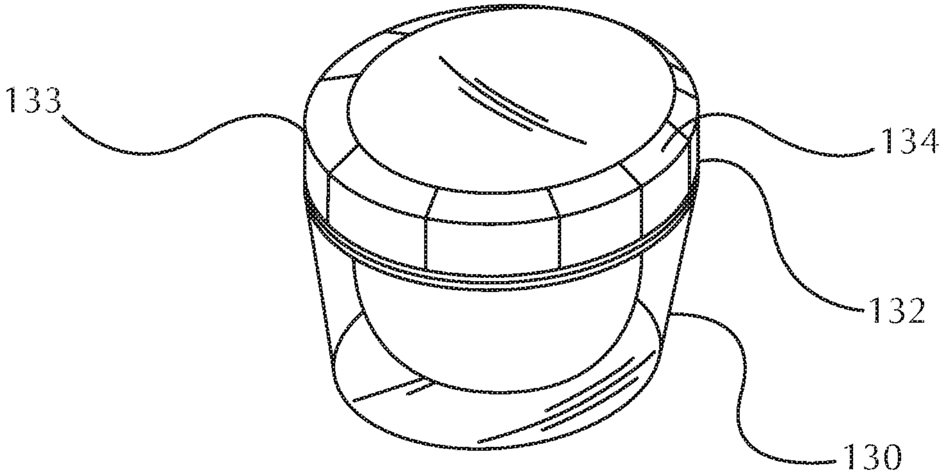
FIG. 7 is a lid having an asymmetrical edge that is decorated differently than the remaining surfaces of the lid according to the present invention.
Figure 8:
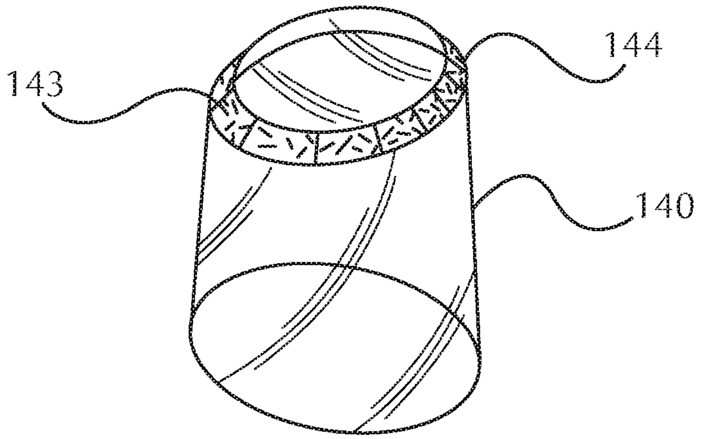
FIG. 8 is a clear over cap having an asymmetrical edge according to the present invention.
Figure 9:
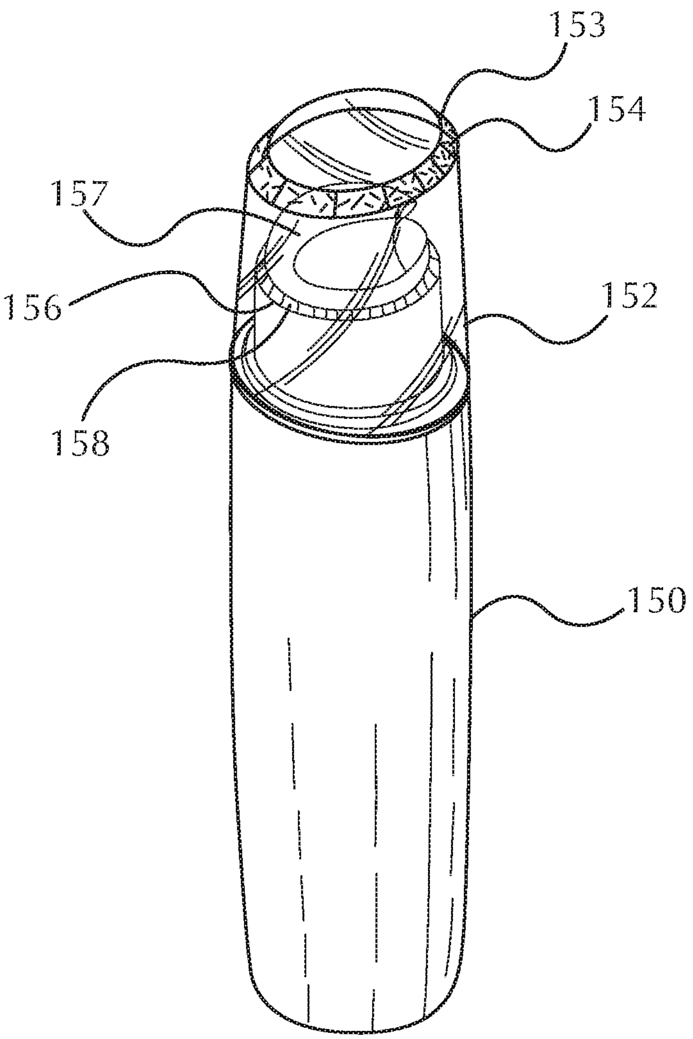
FIG. 9 is a jar with a pump and a clear over cap with an asymmetrical edge according to the present invention; and, FIG. 10 is a jar with a pump having an asymmetrical edge according to the present invention.
Figure 10:
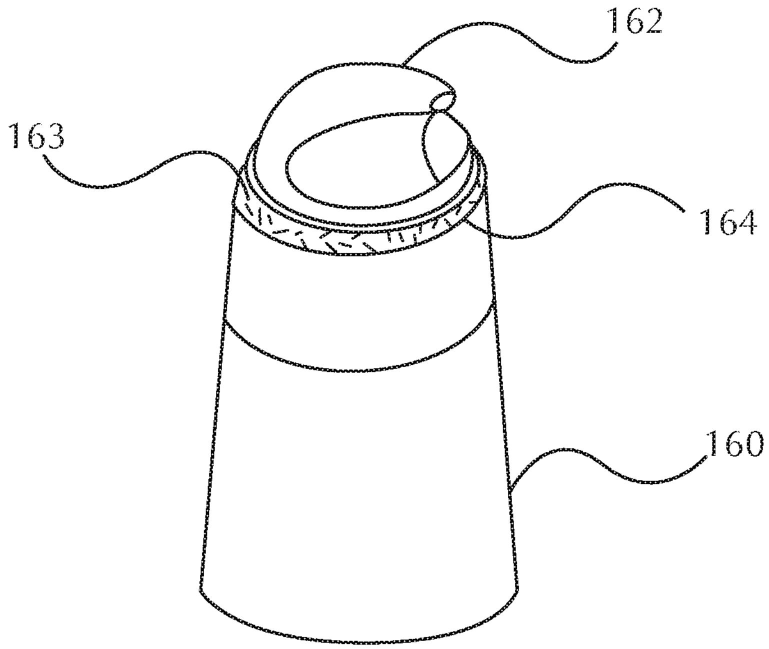

Additionally, the parts of the present invention have an asymmetrical edge that is coated with a thin film as described herein. FIGS. 7-10 show exemplary and non-limiting parts of the present invention. FIG. 7 shows jar 130 having lid 132 with asymmetrical edge 133 that has been decorated with thin film 134. In this example, the part according the present invention is lid 132. Jar 130 could also be a part according to the invention if it had an asymmetrical edge that was decorated. FIG. 8 illustrates a clear plastic over cap 140, having asymmetrical edge 143 with a thin film decorative coating 144. As will be apparent those skilled in the art, over caps are typically used to protect or conceal a pump or the like. FIG. 9 shows jar 150 with clear over cap 152 which has an asymmetrical edge 154 with thin film decoration 153. Moreover, pump 156 is shown under over cap 152. Pump 156 has asymmetrical edge 158 with a film protective coating 157. Jar 160 and pump 162 are shown in FIG. 10 and jar 160 has an asymmetrical edge 162 with protective film coating 163. The parts illustrated in FIGS. 7-10 are exemplary only and those skilled in the art will appreciate the myriad of parts and consumers products that can implement this unique technology.

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for coating an asymmetrical edge with a film, comprising:

(a) a film dispenser;

(b) a film retriever;

(c) a mandrel comprising a film contacting surface;

(d) a part held in place by a part holder and comprising an asymmetrical edge that circumscribes a surface of the part, wherein the asymmetrical edge comprises a first angled edge that has a first angle ($\alpha$) and a second angled edge that has a second angle ($\beta$), wherein $\alpha$ and $\beta$ are not equal and $\alpha$ and $\beta$ are each an angle formed at an intersection between an imaginary line drawn parallel to their respective angled edge and an imaginary line drawn parallel to a bottom of the part; and (e) wherein at least one of the mandrel and the part holder continuously move in an angular relationship to the other as the asymmetrical edge of the part changes angle around the circumscribed surface of the part such that the film contacting surface of the mandrel remains parallel to the asymmetric edge of the part when the asymmetric edge of the part is being coated with the film.

2. The apparatus of claim 1, wherein the angular difference between $\alpha$ and $\beta$ is at least about 3°.

3. The apparatus of claim 1, wherein the film dispenser is configured to hold a first edge of the film and the film retriever is configured to hold an opposing second edge of the film.

4. The apparatus of claim 1, wherein the mandrel is deformable.

5. The apparatus of claim 1, wherein the mandrel is symmetrically shaped.

6. The apparatus of claim 5, wherein the mandrel is frustoconically shaped.

7. The apparatus of claim 1, wherein the film dispenser and the film retriever move co-operatively in at least two dimensions.

8. The apparatus of claim 7, wherein the film dispenser and the film retriever move cooperatively in three dimensions.

9. The apparatus of claim 1, wherein the film dispenser and the film retriever rotate to move the film from the film dispenser to the film retriever and between the mandrel and the part holder.

10. The apparatus of claim 9, wherein the film dispenser and the film retriever rotate intermittently.

11. The apparatus of claim 1, further comprising a mandrel heater.

12. An apparatus for coating an asymmetrical edge of a part with a film, comprising:

(a) a rotatable film dispenser;

(b) a rotatable film retriever;

(c) a mandrel comprising a film contacting surface;

(d) a part holder;

(e) a film comprising a first edge attached to the film dispenser and a second edge attached to the film retriever such that the film travels from the film dispenser to the film retriever and between the mandrel and the part holder when at least one of the film dispenser and the film retriever are rotated;

(f) a part held in place by the part holder and comprising an asymmetrical edge that circumscribes a surface of the part, wherein the asymmetrical edge comprises a first angled edge having a first angle ($\alpha$) and a second angled edge having a second angle ($\beta$), wherein $\alpha$ and $\beta$ are not equal and $\alpha$ and $\beta$ are each an angle formed at an intersection between an imaginary line drawn parallel to their respective angled edge and an imaginary line drawn parallel to a bottom of the part; and (g) wherein at least one of the mandrel and the part holder continuously move in an angular relationship to the other as the asymmetrical edge of the part changes angle around the circumscribed surface of the part such that the film contacting surface of the mandrel remains parallel to the asymmetric edge of the part when the asymmetric edge is being coated with the film.

13. The apparatus of claim 12, wherein the film is a multi-layered film comprising a carrier, a release compound, an adhesive, and at least one of a protective coating and a decorative coating.

14. The apparatus of claim 12, wherein the asymmetrical edge of the part is in physical contact with a coating side of the film and the film contacting surface of the mandrel is in contact with a release side of the film when the asymmetrical edge is being coated with the film.

15. The apparatus of claim 12, wherein the film dispenser and the film retriever move co-operatively in at least two dimensions.

16. The apparatus of claim 15, wherein the cooperative movement of the film dispenser and the film retriever relieves stress on the film by keeping the film parallel to the surface of the mandrel.

17. An apparatus for coating an asymmetrical edge of a circular lid with a film, comprising:

(a) a film dispenser;

(b) a film retriever;

(c) a mandrel comprising a film contacting surface;

(d) a part holder;

(e) a circular lid held in place by the part holder, the circular lid comprising a top wall, a side wall, and an asymmetrical edge that extends at least partially around a circumference of the circular lid between the side wall and the top wall, wherein an angle of the asymmetric edge, relative to the top wall, varies by at least about 3°;

(f) a film comprising a first edge attached to the film dispenser and a second edge attached to the film retriever such that the film travels from the film dispenser to the film retriever and between the mandrel and the part holder;

(g) wherein at least one of the mandrel and the part holder continuously move in an angular relationship to the other as the asymmetrical edge of the part changes angle around the circumference of the circular lid such that the film contacting surface of the mandrel remains parallel to the asymmetric edge of the circular lid when the asymmetric edge is being coated with the film.

18. The apparatus of claim 17, wherein the top wall and side wall intersect along a portion of the circumference of the circular lid.

19. The apparatus of claim 17, wherein the asymmetrical edge extends completely around the circumference of the circular lid.

20. The apparatus of claim 1, wherein the part rotates about a first axis and the mandrel rotates about a second axis, wherein the first axis and the second axis intersect and wherein the angle between the first and second axis changes as a result of the movement of the mandrel and/or the part holder.

* * * * *